US009140886B2

(12) United States Patent
Tsuji et al.

(10) Patent No.: US 9,140,886 B2
(45) Date of Patent: Sep. 22, 2015

(54) INVERTED MICROSCOPE INCLUDING A CONTROL UNIT CONFIGURED TO SYNCHRONIZE A SWITCHING OPERATION BETWEEN ABSORPTION FILTERS WITH A SWITCHING OPERATION BETWEEN EXCITATION FILTERS

(71) Applicant: OLYMPUS CORPORATION, Tokyo (JP)

(72) Inventors: Haruyuki Tsuji, Ina (JP); Masayoshi Karasawa, Nagano (JP)

(73) Assignee: OLYMPUS CORPORATION, Tokyo (JP)

( * ) Notice: Subject to any disclaimer, the term of this patent is extended or adjusted under 35 U.S.C. 154(b) by 238 days.

(21) Appl. No.: 13/870,863

(22) Filed: Apr. 25, 2013

(65) Prior Publication Data

US 2013/0286473 A1    Oct. 31, 2013

(30) Foreign Application Priority Data

Apr. 27, 2012    (JP) .................................. 2012-103817

(51) Int. Cl.
| | |
|---|---|
| G02B 21/00 | (2006.01) |
| G02B 21/04 | (2006.01) |
| G02B 21/02 | (2006.01) |
| G02B 21/24 | (2006.01) |

(52) U.S. Cl.
CPC ............ *G02B 21/04* (2013.01); *G02B 21/0088* (2013.01); *G02B 21/02* (2013.01); *G02B 21/24* (2013.01)

(58) Field of Classification Search
CPC ....... G02B 21/24; G02B 21/02; G02B 21/365
USPC ................ 250/201.3, 309, 311; 359/368–431
See application file for complete search history.

(56) References Cited

U.S. PATENT DOCUMENTS

| | | | |
|---|---|---|---|
| 5,638,222 A | 6/1997 | Shigehara | |
| 2002/0041438 A1* | 4/2002 | Takahama et al. | ............ 359/363 |

(Continued)

FOREIGN PATENT DOCUMENTS

| | | |
|---|---|---|
| EP | 1 191 380 | 3/2002 |
| EP | 1 491 932 | 12/2004 |

(Continued)

OTHER PUBLICATIONS

Extended European Search Report (EESR) dated Aug. 8, 2013 (in English) issued in counterpart European Application No. 13002233.8.

*Primary Examiner* — Scott J Sugarman
*Assistant Examiner* — Tamara Y Washington
(74) *Attorney, Agent, or Firm* — Holtz, Holtz, Goodman & Chick PC (57) ABSTRACT

An inverted microscope that allows observation of a specimen from underneath includes an objective lens holding unit that holds an objective lens configured to collect at least observation light from the specimen, a tube lens configured to focus the observation light collected by the objective lens, a branching unit configured to branch an optical path of the observation light from the tube lens, and an observation image switching device that is removably provided in a microscope main body between the objective lens and the tube lens and is configured to switch between wavelengths of an observation image or between magnifications of the observation image.

4 Claims, 5 Drawing Sheets

(56) References Cited

U.S. PATENT DOCUMENTS

| | | |
|---|---|---|
| 2004/0263956 A1 | 12/2004 | Ishii |
| 2008/0112070 A1 | 5/2008 | Tanibata et al. |
| 2008/0239475 A1* | 10/2008 | Hirukawa et al. ............. 359/385 |
| 2008/0308727 A1* | 12/2008 | Boguslavsky et al. ........ 250/307 |
| 2011/0170181 A1* | 7/2011 | Yoshikawa et al. ........... 359/385 |

FOREIGN PATENT DOCUMENTS

| | | |
|---|---|---|
| JP | 2000-098251 | 4/2000 |
| JP | 2008-122784 | 5/2008 |

* cited by examiner

INVERTED MICROSCOPE INCLUDING A CONTROL UNIT CONFIGURED TO SYNCHRONIZE A SWITCHING OPERATION BETWEEN ABSORPTION FILTERS WITH A SWITCHING OPERATION BETWEEN EXCITATION FILTERS

CROSS-REFERENCE TO RELATED APPLICATIONS

This application is based upon and claims the benefit of priority from Japanese Patent Application No. 2012-103817, filed on Apr. 27, 2012, the entire contents of which are incorporated herein by reference.

BACKGROUND

1. Technical Field

The disclosure relates to an inverted microscope for observing a specimen by, for example, irradiating a specimen with light and receiving light reflected from or passing through the specimen.

2. Related Art

In medical and biological fields, a microscope is used to observe a specimen by illuminating the specimen for observing cells or the like. Also, in an industrial field, a microscope is used for various purposes, such as quality control of metallographic structure, research and development of new materials, inspection of electronic devices and magnetic heads. As an observation by a microscope, in addition to visual observation, an observation is known in which a specimen image is captured by using an imaging device such as a CCD or CMOS image sensor to display the captured image on a monitor.

A conventional inverted microscope includes at least a main body unit and an optical filter. The main body unit forms a base of the inverted microscope and includes a control substrate that controls the inverted microscope. The optical filter is removably provided in the main body unit and includes an excitation filter and an absorption filter for passing light of a specified wavelength. In the main body unit, a stage on which a specimen is placed, a revolver which holds a plurality of objective lenses having different magnifications and can change the objective lens facing the specimen, and a lamp house which emits incident illumination light are provided. By using a microscope system having a microscope unit as the above described inverted microscope and a camera unit which captures an image of the specimen, it is possible to simultaneously perform a visual observation and a monitor observation which is performed by displaying an image.

Conventionally, for example, as disclosed in Japanese Patent Application Publication Laid-open No. 2008-122784, light of a specified wavelength is extracted from light emitted from the lamp house by the excitation filter and the specimen is irradiated with the extracted light through the objective lens. Thereafter, light of a specified wavelength is extracted by the absorption filter from the light emitted from the specimen and the extracted light is formed into a specimen image. An observer views the specimen image formed by the light of the specified wavelength. In the technique disclosed in Japanese Patent Application Publication Laid-open No. 2008-122784, a plurality of excitation filters and a plurality of absorption filters are provided according to the wavelengths of light and the filters can be switched according to a combination of the extracted wavelengths.

SUMMARY

In accordance with some embodiments, an inverted microscope that allows observation of a specimen from underneath is provided. In some embodiments, the inverted microscope includes an objective lens holding unit that holds an objective lens configured to collect at least observation light from the specimen, a tube lens configured to focus the observation light collected by the objective lens, a branching unit configured to branch an optical path of the observation light from the tube lens, and an observation image switching device that is removably provided in a microscope main body between the objective lens and the tube lens and is configured to switch between wavelengths of an observation image or between magnifications of the observation image.

The above and other features, advantages and technical and industrial significance of this invention will be better understood by reading the following detailed description of presently preferred embodiments of the invention, when considered in connection with the accompanying drawings.

DETAILED DESCRIPTION

Exemplary embodiments will be described with reference to the accompanying drawings. The present invention is not limited by the embodiments described below. In the description below, the drawings only schematically illustrate the shapes, the sizes, and the positional relationships so that contents of the present invention can be understood. Therefore, the present invention is not limited to the shapes, sizes, and positional relationships illustrated in the drawings. Further, in the drawings, part of hatching of the cross sections is omitted for clarification of the configurations. Furthermore, the numerical values illustrated in the description below are only a preferred example of the present invention, so that the present invention is not limited to the illustrated numerical values.

First Embodiment

Figure 1:
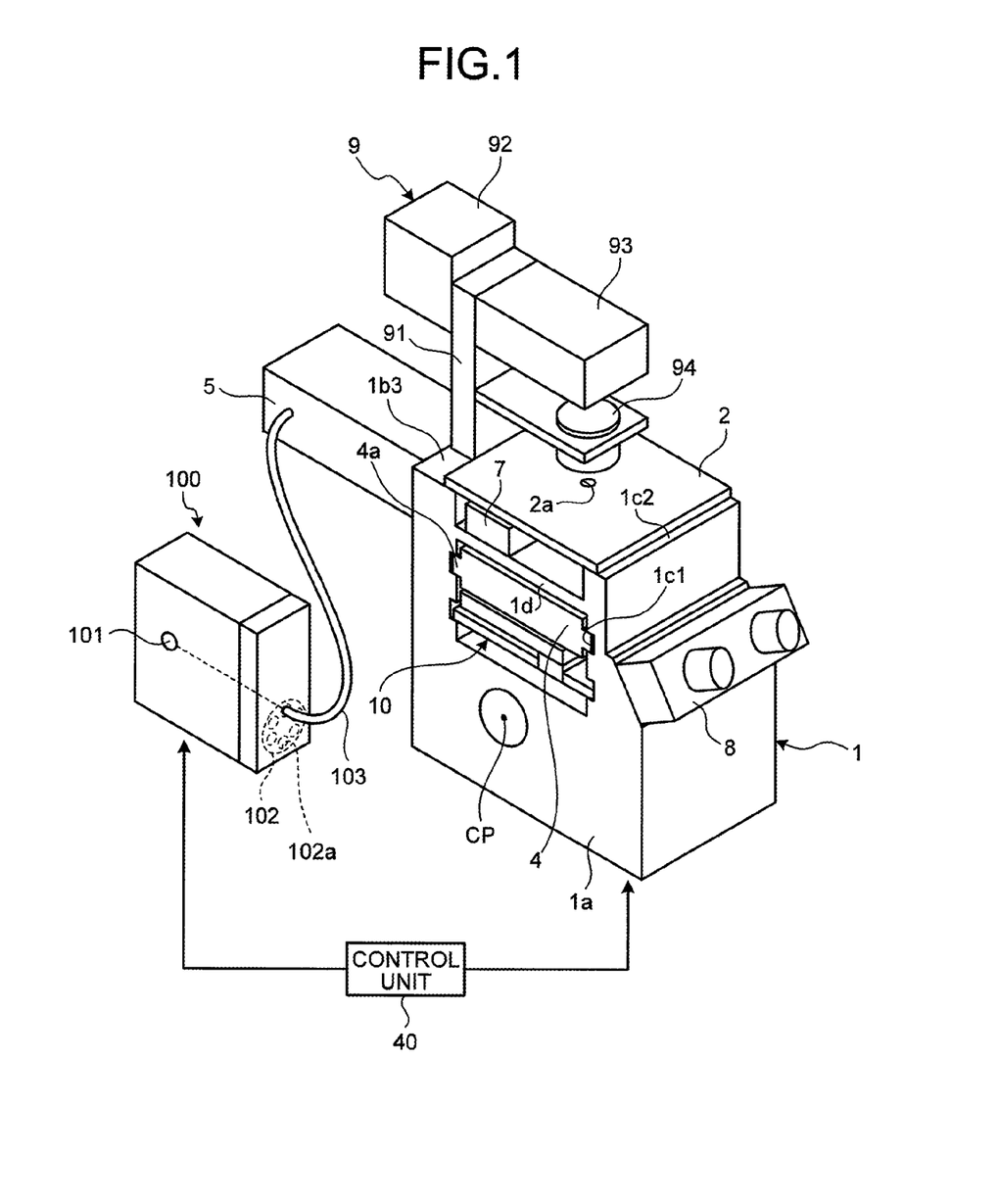
FIG. 1 is a schematic diagram of an entire configuration of an inverted microscope according to a first embodiment of the present invention.
Figure 2:
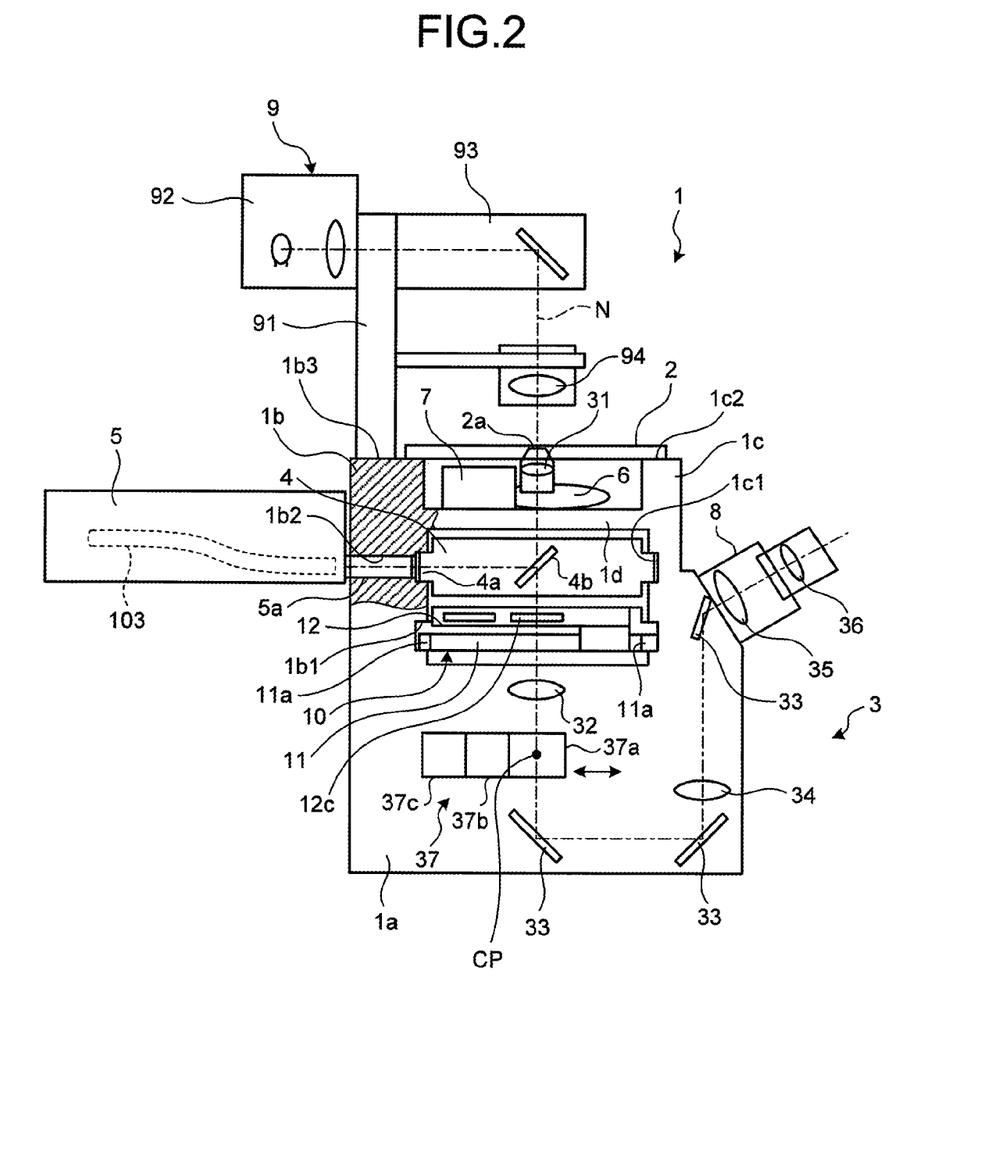
FIG. 2 is a partial cross-sectional view of an internal structure of the inverted microscope illustrated in FIG. 1.

First, an inverted microscope according to a first embodiment will be described in detail with reference to the drawings. FIG. 1 is a schematic diagram illustrating an entire configuration of the inverted microscope according to a first embodiment of the present invention. FIG. 2 is a partial cross-sectional view illustrating an internal structure of the inverted microscope illustrated in FIG. 1.

The inverted microscope is a microscope which observes a specimen to be observed from below the specimen. The inverted microscope includes a microscope main body 1, a stage 2 supported by the microscope main body 1, and an observation optical system 3 which observes the specimen placed on the stage 2 from below the specimen. The inverted microscope is driven under control of a control unit 40 that controls the entire inverted microscope.

The microscope main body 1 has a box-like shape and includes a base portion 1a extending in a front-rear direction, a rear wall portion 1b extending upward from a rear edge portion of the base portion 1a, a front wall portion 1c extending upward from a front edge portion of the base portion 1a, and a beam portion 1d that interconnects an upper portion of the rear wall portion 1b and an upper portion of the front wall portion 1c together. Mounting areas of an illumination light introduction device 4 and an observation image switching device 10 that switches a wavelength of an observation image (specimen image) are defined in an area below the beam portion 1d and an attaching area of an objective lens 31 (see FIG. 2) is defined in an area above the beam portion 1d.

Two pairs of fitting grooves 1b1 and 1c1, which form the pair in the front and rear, are formed in a vertical direction inside the rear wall portion 1b and inside the front wall portion 1c where the mounting area is formed. The pairs of fitting grooves 1b1 and 1c1 are provided to removably mount the illumination light introduction device 4 and the observation image switching device 10. The fitting grooves 1b1 and 1c1 extend in the left-right direction. Rectangular column shaped convex portions 4a provided to the illumination light introduction device 4 and convex portions 11a provided to the observation image switching device 10 can fit into the fitting grooves 1b1 and 1c1. The convex portions 4a provided to the illumination light introduction device 4 and the convex portions 11a provided to the observation image switching device 10 are guided into the fitting grooves 1b1 and 1c1, so that the illumination light introduction device 4 and the observation image switching device 10 are mounted in the microscope main body 1. The mounted illumination light introduction device 4 is positioned and fixed by the convex portions 4a and the fitting grooves 1b1 and 1c1. Although two pairs of fitting grooves 1b1 and 1c1 are formed in the vertical direction in the description of the present embodiment, three or more pairs of fitting grooves 1b1 and 1c1 may be formed.

As illustrated in FIG. 2, fitting holes 1b2 connected to each of the aforementioned two fitting grooves 1b1 are formed in parallel in the vertical direction in the rear wall portion 1b. The fitting hole 1b2 is provided to attach a light source connection unit 5. A cylindrical convex portion 5a provided to the light source connection unit 5 can fit into the fitting hole 1b2. The convex portion 5a provided to the light source connection unit 5 is guided into the fitting hole 1b2, so that the light source connection unit 5 is attached to the microscope main body 1. The attached light source connection unit 5 is positioned and fixed by the convex portion 5a and the fitting hole 1b2.

A revolver 6 (objective lens holding unit) and a focusing device 7 are attached to the upper surface of the beam portion 1d which forms the attaching area. The revolver 6 can rotate and move up and down. A plurality of objective lenses 31 having magnifications different from each other can be mounted on the revolver 6. One of the objective lenses 31 mounted on the revolver 6 is arranged on an optical axis. The focusing device 7 is to adjust the focus of the objective lens 31 to the specimen. When the focusing device 7 is operated, the revolver 6 moves up and down and the focus of the objective lens 31 mounted on the revolver 6 is adjusted to the specimen. A nose piece may be used instead of the revolver 6. The nose piece can place a desired objective lens 31 above the specimen by using a slider provided slidably in a direction perpendicular to the optical axis of the objective lens 31.

As illustrated in FIGS. 1 and 2, an upper surface 1b3 of the rear wall portion 1b and an upper surface 1c2 of the front wall portion 1c form the same plane extending in the horizontal direction. The stage 2 is attached to and supported by the upper surface 1b3 of the rear wall portion 1b and the upper surface 1c2 of the front wall portion 1c.

The stage 2 has a plate shape whose upper and lower surfaces are flat. The specimen is placed on the upper surface of the stage 2. An aperture (transmission hole) 2a having a size from which the specimen does not drop is provided at approximately the center of the stage 2. The excitation light or the observation light from the specimen passes through the opening.

As illustrated in FIG. 2, the observation optical system 3 enables the observation of the specimen and is provided over the microscope main body 1 and a lens barrel 8 attached to the microscope main body 1. The observation optical system 3 includes a tube lens 32, mirrors 33, a relay lens 34, a tube lens 35, and an ocular lens 36 in addition to the objective lens 31 described above. A camera port CP connected to a camera including an image sensor (imaging device) such as a CCD or CMOS image sensor is provided between the tube lens 32 and the mirrors 33 (relay lens 34). For example, the camera port CP extends from the optical axis N of the objective lens 31 in a direction perpendicular to the page. The observation optical system 3 includes a branching unit 37 that divides the optical path of the observation light imaged by the tube lens 32 into an optical path on the side of the ocular lens 36 and an optical path on the side of the camera port CP.

The tube lens 32, the mirrors 33, the relay lens 34 are mounted inside the microscope main body 1. The observation light, which passes through the objective lens 31 to be a parallel light flux, passes through the tube lens 32 to be imaged and enters the lens barrel 8 through the mirrors 33 and the relay lens 34.

The tube lens 35 and the ocular lens 36 are mounted inside the lens barrel 8. The observation light that enters from the microscope main body 1 passes through the tube lens 35 to be imaged and the image is observed when looking into the ocular lens 36.

The branching unit 37 includes three prisms 37a to 37c. One of the three prisms 37a to 37c can be arranged, for example, at a position at which a straight line passing through the camera port CP and being perpendicular to the optical axis N intersects with the optical axis N. For example, the prism 37a transmits 100% of light on the optical axis. The prism 37b transmits 50% of the light on the optical axis N and reflects the remaining 50% of the light on the optical axis N in a direction perpendicular to the optical axis N (which is a direction perpendicular to the page in FIG. 2 and the optical path leading to the camera port CP). The prism 37c reflects 100% of the light on the optical axis N in the direction perpendicular to the optical axis N. The light passing through the prism 37a or the prism 37b of the branching unit 37 is guided to the optical path on the side of the ocular lens 36. The light reflected by the prism 37b or the prism 37c of the branching unit 37 in the direction perpendicular to the optical axis N enters the camera port CP. The transmittances and the reflectances of light of the prisms 37a to 37c are not limited to the above described transmittances and the reflectances, but any transmittance and reflectance may be applied if the prisms 37a to 37c have transmittances and reflectances different from each other.

The illumination light introduction device 4 has a substantially rectangular column shape. The convex portions 4a protruding from a pair of side surfaces facing each other among pairs of side surfaces facing each other on the rectangular column are formed. A dichroic mirror 4b that selectively reflects or transmits light of a specified wavelength is provided inside the illumination light introduction device 4. Specifically, the dichroic mirror 4b reflects light introduced from the light source connection unit 5 toward the stage 2 and transmits light emitted from the specimen on the stage 2 or light passing through the specimen.

The light source connection unit 5 transmits light for incident-light illumination emitted from a lamp house 100 into the base portion 1a. The lamp house 100 includes a light source 101 that emits the light for incident-light illumination and a filter switching turret 102 having a plurality of excitation filters 102a that select and transmit light according to a wavelength of excitation light for exciting a luminescent material included in the specimen from the light emitted from the light source 101. The light source connection unit 5 and the lamp house 100 are connected to each other by an optical fiber cable 103. In the filter switching turret 102, the excitation filters 102a having substantially a disk shape and transmitting light of different wavelengths are arranged in a ring shape.

In the lamp house 100 (light source unit), the filter switching turret 102 is rotated so that the excitation filter 102a that transmits a desired wavelength is positioned at a connection position of the optical fiber cable 103. Thereby, it is possible to select the wavelength of the light introduced from the lamp house 100 to the microscope main body 1. At this time, it is preferable that the optical axis of the light source 101 passes through the connection position of the optical fiber cable 103.

The excitation light introduced into the optical fiber cable 103 is inputted into the illumination light introduction device 4 through the convex portion 5a, reflected by the dichroic mirror 4b provided inside the illumination light introduction device 4, and illuminates the specimen on the stage 2.

The inverted microscope illustrated in FIGS. 1 and 2 includes a transmitted-light illumination device 9. The transmitted-light illumination device 9 is mounted in an area above the microscope main body 1. The transmitted-light illumination device 9 includes a support post 91, a light source 92 which is attached to the support post 91 and emits light for the transmitted-light illumination, a projector 93 attached to the support post 91, and a condenser lens 94 attached to the support post 91.

The observation image switching device 10 is removably provided in the microscope main body 1, has a substantially rectangular column shape, and includes a base 11 on which convex portions 11a protruding from a pair of side surfaces facing each other among pairs of side surfaces facing each other on the rectangular column are formed and a filter switching unit 12 which is fixed to the base 11 and includes a plurality of absorption filters 12c that selectively absorb wavelengths of light and transmit light of a specified wavelength. The filter switching unit 12 causes a desired absorption filter 12c to be arranged on the optical axis of the objective lens 31 by a filter switching operation. When the observation image switching device 10 is mounted in the mounting area, the observation image switching device 10 is arranged closer to the objective lens 31 than the branch point (branching unit 37) between the optical path leading to the ocular lens 36 and the optical path leading to the camera port CP. The filter switching unit 12 switches between the excitation filters 102a and between the absorption filters 12c in synchronization with the filter switching turret 102 under control of the control unit 40. For example, the filter switching operation is performed within 100 milliseconds.

In the inverted microscope described above, when the illumination light introduction device 4 is mounted in the mounting area, the convex portions 4a provided on the illumination light introduction device 4 are inserted into the fitting grooves 1b1 and 1c1 provided in the microscope main body 1. The convex portions 4a provided on the illumination light introduction device 4 are guided into the fitting grooves 1b1 and 1c1 provided in the microscope main body 1, so that the illumination light introduction device 4 is mounted in the microscope main body 1. Further, the convex portions 11a provided on the observation image switching device 10 are inserted into the fitting grooves 1b1 and 1c1 provided in the microscope main body 1. The convex portions 11a provided on the observation image switching device 10 are guided into the fitting grooves 1b1 and 1c1 provided in the microscope main body 1, so that the observation image switching device 10 is mounted in the microscope main body 1. Then, the mounted illumination light introduction device 4 and the observation image switching device 10 are positioned and fixed by the convex portions 4a and 11a and the fitting grooves 1b1 and 1c1.

In the inverted microscope having the configuration described above, in the case of epi-illumination, the wavelength of the incident illumination light from the light source 101 is selected by the excitation filter 102a and the epi-illumination light is reflected toward the objective lens 31 by the dichroic mirror 4b of the illumination light introduction device 4. When the illumination light reflected by the dichroic mirror 4b is irradiated to the specimen on the stage 2 through the objective lens 31, for example, fluorescent dye or fluorescent protein in a cell in the specimen is excited and fluorescent light is emitted. The emitted fluorescent light is inputted into the objective lens 31 as an image, transmitted through the dichroic mirror 4b and the absorption filter 12c, imaged by the tube lens 32, and visually observed by an observer at the ocular lens 36 through the relay lens 34 and the tube lens 35.

In the case of transmitted-light illumination, when the transmitted-light illumination light from the transmitted-light illumination device 9 is reflected by the mirror and irradiated to the specimen on the stage 2, the light passing through the specimen is inputted into the objective lens 31, imaged by the tube lens 32, and visually observed by an observer at the ocular lens 36 through the relay lens 34 and the tube lens 35. Transmitted-light observation is used when performing a bright field observation, a phase contrast observation, a differential interference observation, and the like. In the case of transmitted-light illumination, the illumination light introduction device 4 and the observation image switching device 10 are not mounted and light of all wavelengths that passes through the specimen is inputted into the tube lens 32.

Figure 3:
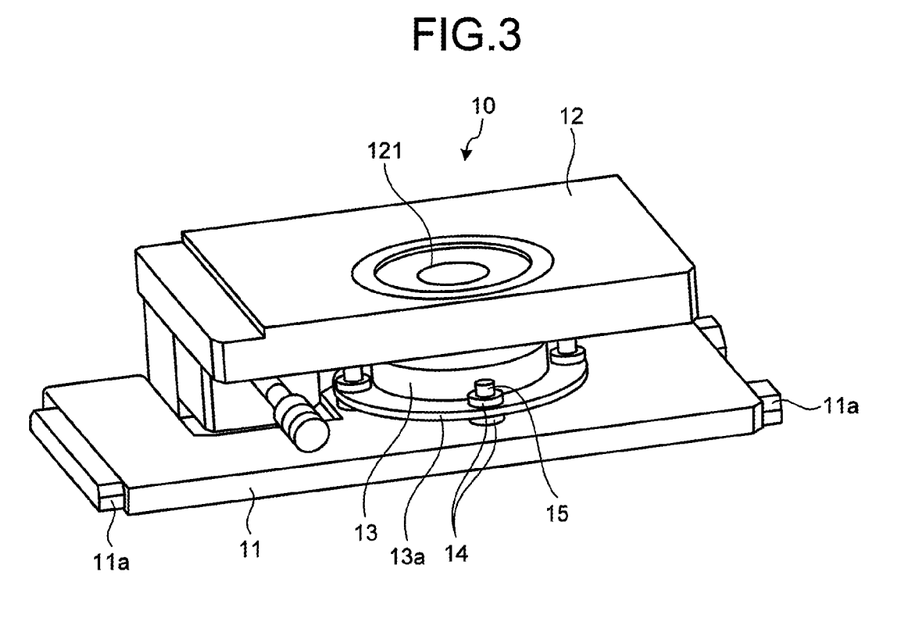
FIG. 3 is a perspective view of an observation image switching device of the inverted microscope according to the first embodiment.
Figure 4:
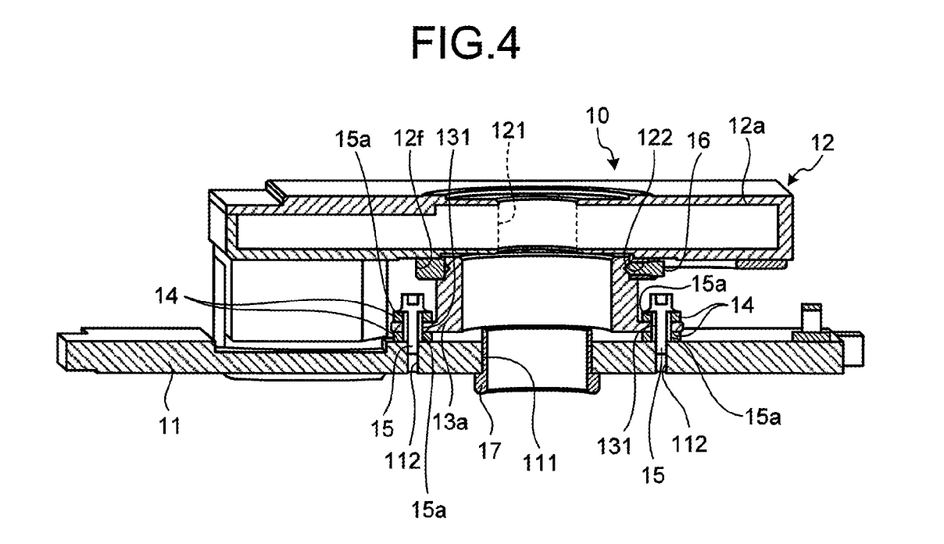
FIG. 4 is a partial cross-sectional view of the observation image switching device of the inverted microscope according to the first embodiment.

FIG. 3 is a perspective view schematically illustrating a configuration of the observation image switching device 10 of the inverted microscope according to the first embodiment. FIG. 4 is a partial cross-sectional view illustrating a configuration of the observation image switching device 10 of the inverted microscope according to the first embodiment.

As described above, the observation image switching device 10 has a substantially rectangular column shape and includes the base 11 on which convex portions 11a protruding from a pair of side surfaces facing each other among pairs of side surfaces facing each other on the rectangular column are formed and a filter switching unit 12 which is fixed to the base 11 and includes a plurality of absorption filters 12c that selectively absorb wavelengths of light and transmit light of a specified wavelength.

In the base 11, a through hole 111 which is provided at a position through which the optical axis of the objective lens 31 passes when the observation image switching device 10 is mounted in the mounting area of the microscope main body 1 and which penetrates in the plate thickness direction and a plurality of threaded screw holes 112 provided around the through hole 111 are formed.

Figure 5:
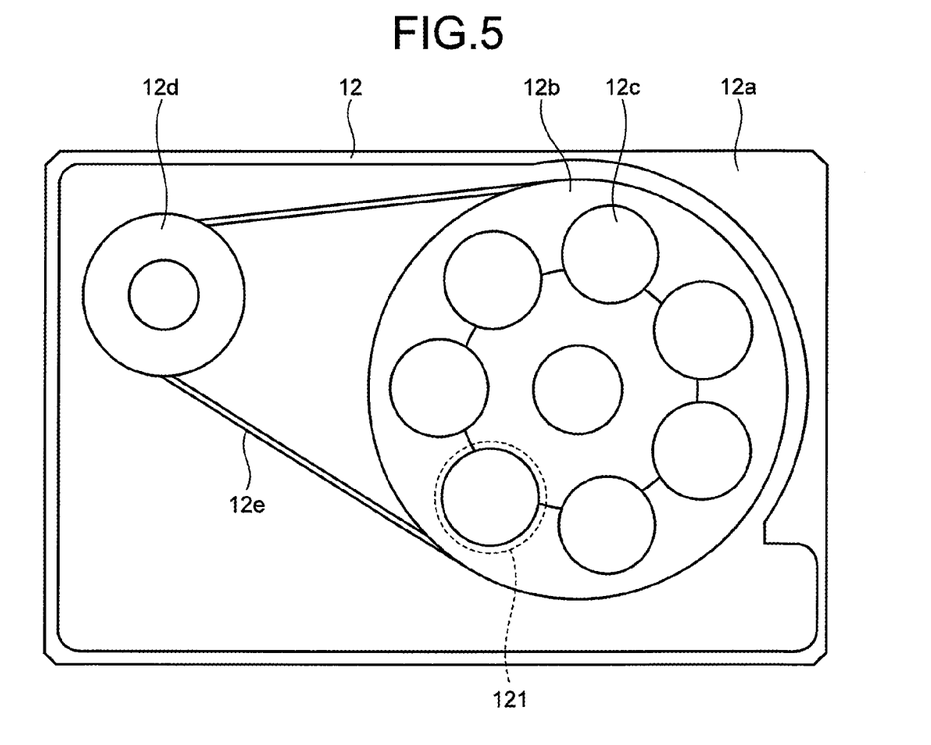
FIG. 5 is a schematic diagram of a filter switching unit of the inverted microscope according to the first embodiment.

FIG. 5 is a schematic diagram illustrating a configuration of the filter switching unit 12 of the inverted microscope according to the first embodiment. The filter switching unit 12 includes a flat plate-shaped main body unit 12a in which a substantially column shaped internal space is formed, a turret 12b which is provided inside the main body unit 12a, has a disk shape, and can rotate around the center of the disk, a plurality of (in the present embodiment, seven) absorption filters 12c which are supported by the turret 12b, transmit light having wavelengths different from each other, and absorb light having wavelengths other than the above wavelengths, a rotation member 12d which is provided to be able to rotate in the main body unit 12a, and a belt 12e which connects the turret 12b with the rotation member 12d.

In the main body unit 12a, an aperture portion 121 which penetrates in the thickness direction of the flat plate is formed. A motive power generated by the rotation of the rotation member 12d is inputted into the turret 12b through the belt 12e and the turret 12b rotates by the inputted motive power. The rotation member 12d is driven by, for example, a motor under control of the control unit 40. The turret 12b causes one of the absorption filters 12c to be arranged at the aperture portion 121 by the rotation of the turret 12b.

The main body unit 12a includes a cylindrical portion 12f which is provided around the aperture portion 121 and protrudes along a penetrating direction of the aperture portion 121. In the cylindrical portion 12f, a through hole 122 which penetrates in a direction perpendicular to the side surface of the cylindrical portion from the side surface.

A connection member 13 is provided between the base 11 and the filter switching unit 12 and the base 11 and the filter switching unit 12 are connected through the connection member 13. The base 11 and the filter switching unit 12 are not in contact with each other except for the connection portion formed by the connection member 13.

The connection member 13 has a substantially cylindrical shape and includes a ring-shaped flange portion 13a protruding in a plate shape from an outer circumferential side surface of one end of the cylindrical shape in a direction perpendicular to the side surface. In the flange portion 13a, a plurality of through holes 131 penetrating in the plate thickness direction are formed corresponding to the threaded screw holes 112.

In the connection member 13, ring-shaped elastic members 14 (anti-vibration unit) formed of an elastic material such as rubber are arranged to sandwich the flange portion 13a corresponding to the through holes 131. Here, the internal aperture of the ring shape of the elastic member 14 has a diameter equal to or a little greater than that of the through hole 131.

The connection member 13 is fixed to the base 11 by screws 15 which pass through the through holes 131 and screw with the threaded screw holes 112. At this time, a cylindrical collar 15a is arranged between the base 11 and the head portion of the screw 15, so that the amount of insertion of the screw 15 into the base 11 is limited. The length of the collar 15a in the cylinder central axis direction is greater than or equal to a sum of the length of the flange portion 13a in the plate thickness direction and the lengths of the elastic members 14 in the central axis direction of the ring of the elastic member 14. Thereby, the load from the head portion of the screw 15 is not applied to the elastic members 14, so that vibration generated in the base 11 or the connection member 13 can be reliably absorbed (removed) by an elastic force of the elastic members 14.

On the other hand, the end portion of the connection member 13 opposite to the base 11 is housed in the cylindrical portion 12f, inserted into the through hole 122 of the main body unit 12a, and fixed to the filter switching unit 12 by a vis 16 that comes into contact with the connection member 13.

A cylindrical member 17 having a cylindrical shape which fits into at least the through hole 111 and protrudes toward the connection member 13 is provided in the through hole 111 of the base 11. The cylindrical member 17 protrudes from the base 11 toward the connection member 13 by a height higher than at least the height of the elastic member 14 (the length of the ring in the central axis direction of the ring). Thereby, light is prevented from leaking from a gap between the upper surface of the base 11 and the lower surface of the connection member 13 generated by the elastic members 14. The cylindrical member 17 is preferred to be formed of a material having a light blocking effect. The cylindrical member 17 may be screwed to be fixed to the through hole 111 instead of being fitted into the through hole 111.

Here, when the base 11, the filter switching unit 12, and the connection member 13 are fixed to each other, the central axes of the through hole 111 (internal space of the cylindrical member 17), the aperture portion 121, and the through hole 131 correspond to each other. It is preferable that the central axes corresponding to each other corresponds to the optical axis of the objective lens 31 when the observation image switching device 10 is mounted in the mounting area of the microscope main body 1.

According to the first embodiment described above, the observation image switching device 10 (filter switching unit 12) is arranged closer to the objective lens 31 than the branch point (branching unit 37) between the camera port CP and the ocular lens 36, in other words, arranged between the objective lens 31 and the tube lens 32, so that the simultaneous observation can be performed by a simple configuration.

According to the first embodiment described above, the filter switching unit 12 is connected to the base, which is mounted in the base portion of the inverted microscope, through the elastic members, so that stable observation of the specimen image can be performed regardless of the switching operation between the absorption filters 12c.

In the above description of the first embodiment, the absorption filters 12c are arranged in the filter switching unit 12. However, neutral density filters (ND filters) may be arranged instead of the absorption filters 12c. A plurality of the ND filters can be arranged according to the intensity of light extinction. Dousers may be arranged instead of the absorption filters 12c.

In the transmitted-light illumination device 9, the aforementioned filter switching turret 102 having the plurality of excitation filters 102a may be provided. Thereby, even in a transmitted-light illumination observation, it is possible to observe the specimen by selecting a wavelength of the observation light.

In the above description of the first embodiment, the observation image switching device 10 switches between the wavelengths of the observation image. However, for example, a lens may be used instead of the absorption filter 12c when performing an observation which does not use fluorescent light emitted from the specimen. Thereby, it is possible to switch the magnification of the specimen image and fine-tune the magnification without switching the objective lens 31 by the revolver 6.

Figure 6:
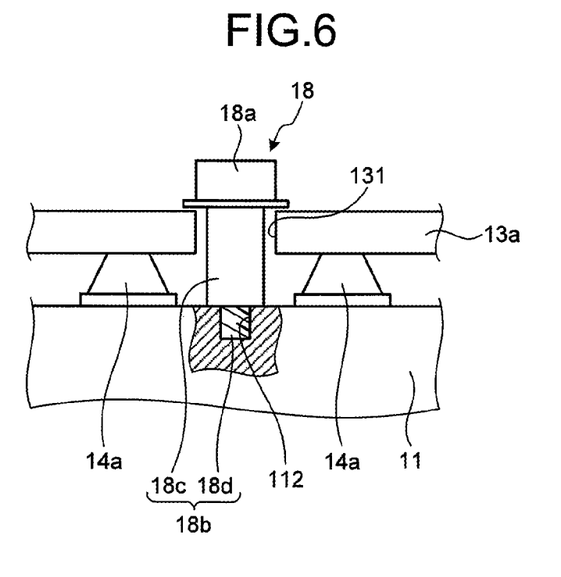
FIG. 6 is a partial cross-sectional view schematically illustrating a configuration of a main part of an inverted microscope according to a first modified example of the first embodiment.

FIG. 6 is a partial cross-sectional view schematically illustrating a configuration of a main part of an inverted microscope according to a first modified example of the first embodiment. In the above description of the first embodiment, the amount of insertion of the screw 15 is limited by the collar 15a. However, it is not limited to this and a screw 18 having a shape in which the shaft portion has a step shape may be used.

The screw 18 includes a head portion 18a having a substantially column shape, a shaft portion 18b extending from one end of the head portion 18a. The shaft portion 18b includes an extending portion 18c having a column shape and extending from one end of the head portion 18a and a screwing portion 18d which extends from a side of the extending portion 18c opposite to the side connecting to the head portion 18a and can screw with the threaded screw hole 112. The length of the screwing portion 18d in a direction perpendicular to the direction in which the extending portion 18c extends is smaller than the length of the extending portion 18c in that direction. The amount of insertion of the screw 18 into the base 11 is determined according to the extending length of the extending portion 18c. The length of the end portion of the head portion 18a on the side of the extending portion 18c in a direction perpendicular to the central axis of the head portion 18a is greater than the diameter of the aperture of the through hole 131.

The flange portion 13a is supported by the base 11 through elastic members 14a (anti-vibration unit). The elastic member 14a is formed of a material having elasticity such as rubber and has a substantially spindle shape in which flat surfaces perpendicular to the central axis are formed on both ends in the central axis direction. The upper end position of the flange portion 13a from the base 11 by the support of the elastic members 14a is lower than the height position of the extending portion 18c from the base 11 when the extending portion 18c is in contact with the base 11. Thereby, the head portion of the screw 18 and the flange portion 13a are not in contact with each other, so that no load is applied from the head portion 18a to the flange portion 13a. Therefore, when the connection member 13 is vibrated by vibration generated by the filter switching unit 12, it is possible to prevent the vibration from being transmitted to the screw 18 by contact between the connection member 13 and the screw 18. In other words, the vibration transmitted from the filter switching unit 12 to the connection member 13 is absorbed by the elastic members 14a. It is preferable that the height position of the extending portion 18c from the base 11 is set to be higher than or equal to the maximum height position of the flange portion 13a achieved when the flange portion 13a vibrates and the head portion 18a of the screw 18 and the flange portion 13a come into contact with each other when the flange portion 13a is higher than or equal to the maximum height position of the flange portion 13a achieved when the flange portion 13a vibrates.

According to the first modified example, in the same manner as in the first embodiment described above, the filter switching unit 12 is connected to the base, which is mounted in the base portion of the inverted microscope, through the elastic members 14a, so that stable observation of the specimen can be performed regardless of the switching operation between the absorption filters 12c.

Second Embodiment

Figure 7:
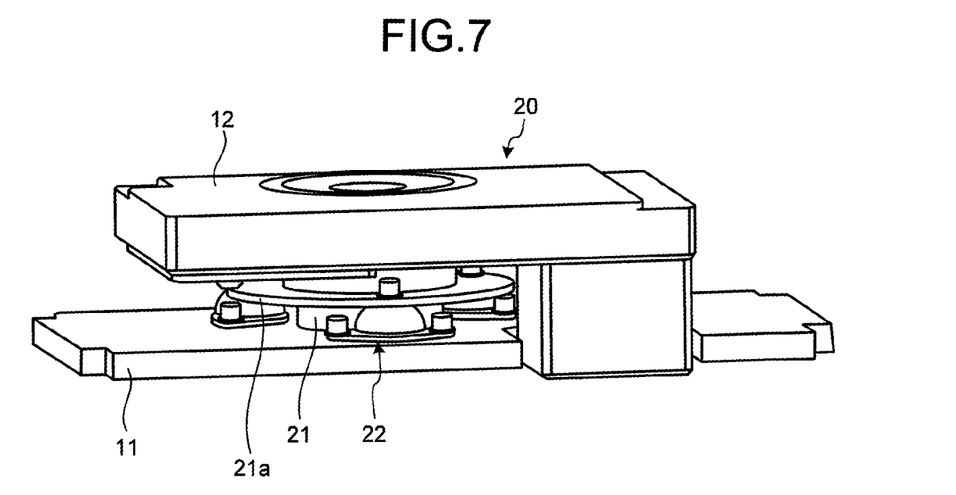
FIG. 7 is a perspective view of a configuration of an observation image switching device of an inverted microscope according to a second embodiment of the present invention.
Figure 8:
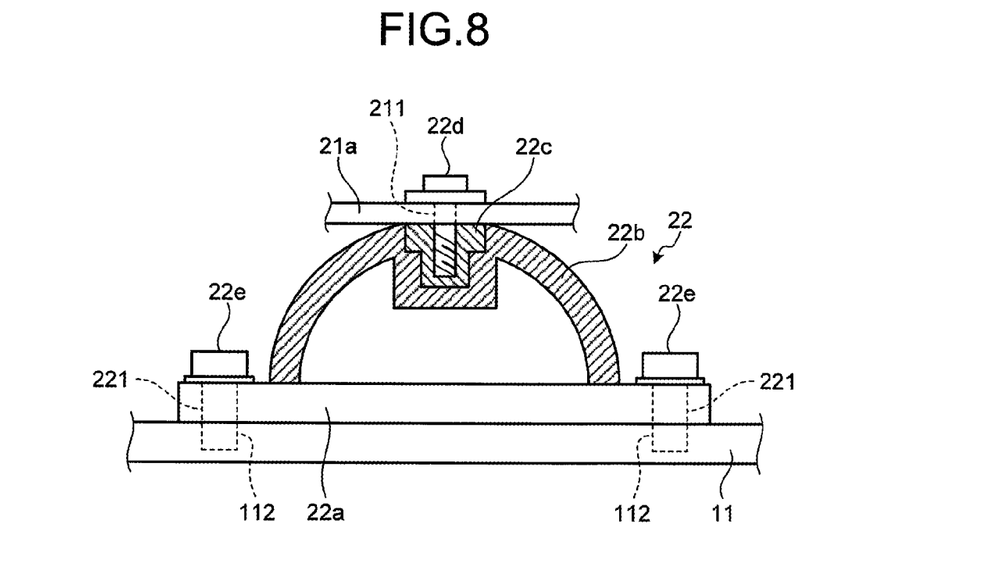
FIG. 8 is a partial cross-sectional view of the observation image switching device of the inverted microscope according to the second embodiment.

FIG. 7 is a perspective view schematically illustrating a configuration of an observation image switching device 20 of an inverted microscope according to a second embodiment. FIG. 8 is a partial cross-sectional view schematically illustrating the configuration of the observation image switching device 20 of the inverted microscope according to the second embodiment. The same reference numerals are given to the same components as those in the configuration described in FIG. 1 and the like.

In the same manner as in the first embodiment described above, the inverted microscope according to the second embodiment is a microscope for observing a specimen from underneath. The inverted microscope includes the microscope main body 1 described above, the stage 2 supported by the microscope main body 1, and the observation optical system 3 which observes the specimen placed on the stage 2 from below the specimen. In the microscope main body 1, mounting areas of the illumination light introduction device 4 and the observation image switching device 20 are defined and an attaching area of the objective lens 31 (see FIG. 2) is defined in an upper area.

The observation image switching device 20 includes the base 11 and the filter switching unit 12 described above. The filter switching unit 12 causes the desired absorption filter 12c to be arranged on the optical axis of the objective lens 31 by a filter switching operation. When the observation image switching device 20 is mounted in the mounting area, the observation image switching device 20 is arranged closer to the objective lens 31 than the branch point between the optical path leading to the ocular lens 36 and the optical path leading to the camera port CP (see FIG. 2).

A connection member 21 is provided between the base 11 and the filter switching unit 12, and the base 11 and the filter switching unit 12 are connected through the connection member 21. The base 11 and the filter switching unit 12 are not in contact with each other except for the connection portion formed by the connection member 21.

The connection member 21 has a substantially cylindrical shape and includes a ring-shaped flange portion 21a protruding in a plate shape from an outer circumferential side surface of a central portion of the cylindrical shape in a direction perpendicular to the side surface. In the flange portion 21a, a plurality of through holes 211 penetrating in the plate thickness direction are formed.

The connection member 21 is fixed to the filter switching unit 12 by a vis as described above and fixed to the base 11 through elastic members 22 (anti-vibration unit). The elastic members 22 are arranged corresponding to the through holes 211.

The elastic member 22 includes through holes 221 formed corresponding to the screw holes 112, a flat plate-shaped base portion 22a attached to the base 11, an elastic portion 22b which has a substantial cup shape formed of an elastic material such as rubber and where an opening end portion of the cup shape is in contact with the base portion 22a, a screwing portion 22c which is connected to the bottom portion of the cup shape and in which a screw hole is formed on the outer surface of the elastic portion 22b, a screw 22d which is inserted into the through hole 211 and screwed into the screwing portion 22c, and screws 22e which are inserted into the through holes 221 and screwed into the screw holes 112. It is preferable that the screwing portion 22c is formed of a rigid material such as a metal in order to provide reliable fixation by the screw 22d.

Here, when the base 11 and the filter switching unit 12 are connected to each other by the connection member 21 and the elastic members 22, the space between the base 11 and the filter switching unit 12 is supported by the elastic portions 22b. As a result, vibrations generated from the base 11 and the filter switching unit 12 can be removed by the elastic portions 22b which are elastically deformed by the vibrations. In this case, although, in the first embodiment described above, the elastic member 14 mainly removes the vibration in the longitudinal direction of the arranged screw 15, in the second embodiment, for example, vibration in a direction perpendicular to the longitudinal direction of the screw 15 can be removed.

According to the second embodiment, vibrations can be flexibly removed regardless of the direction of the vibration in addition to obtaining the same effects as those of the first embodiment.

Although, in the embodiments described above, the inverted microscope is described as an example, the present invention can be applied to, for example, an imaging device which forms a differential interference observation optical system and includes an objective lens that enlarges the specimen, an imaging function for imaging the specimen through the objective lens, and a display function for displaying an image, such as a video microscope, for example.

As described above, the inverted microscope according to the present invention is effective to perform the simultaneous observation by a simple configuration.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An inverted microscope that allows observation of a specimen from underneath, the inverted microscope comprising:
    an objective lens holding unit that holds an objective lens configured to collect at least observation light from the specimen;
    a tube lens configured to focus the observation light collected by the objective lens;
    a branching unit configured to branch an optical path of the observation light from the tube lens;
    an observation image switching device which is removably provided in a microscope main body between the objective lens and the tube lens and which is configured to switch between wavelengths of an observation image or between magnifications of the observation image, wherein the observation image switching device includes a filter switching unit which has a plurality of absorption filters for absorbing light of wavelengths other than a specified wavelength and which is configured to cause one of the plurality of absorption filters to be arranged on an optical axis of the objective lens;
    a light source unit which includes a plurality of excitation filters for transmitting light of a specific wavelength to excite a fluorophore in the specimen and which is configured to select a wavelength of light to be introduced into the microscope main body by switching between the excitation filters;
    a dichroic mirror configured to selectively reflect or transmit the light of the specific wavelength from the light source unit; and
    a control unit configured to synchronize a switching operation between the absorption filters with a switching operation between the excitation filters.

2. The inverted microscope according to claim 1, wherein the observation image switching device includes a base which is removably provided in the microscope main body and which has a through hole penetrating the base in a specified direction, and
    wherein the filter switching unit is fixed to the base and is configured to cause one of the plurality of absorption filters to be arranged on the through hole.

3. The inverted microscope according to claim 2, further comprising an anti-vibration unit which is provided between the base and the filter switching unit and which is configured to remove vibration generated from at least one of the base and the filter switching unit.

4. The inverted microscope according to claim 1, wherein the branching unit is configured to branch the optical path of the observation light from the tube lens into a first optical path leading to an ocular lens for a visual observation and a second optical path leading to a camera port to which a camera having an imaging device is connected.

* * * * *